United States Patent [19]

Johnson

[11] Patent Number: 4,523,479
[45] Date of Patent: Jun. 18, 1985

[54] FLUID FLOW MEASURING DEVICE

[75] Inventor: Horace J. Johnson, Port Townsend, Wash.

[73] Assignee: Cadillac Meter Company, Port Townsend, Wash.

[21] Appl. No.: 525,053

[22] Filed: Aug. 22, 1983

[51] Int. Cl.³ .................................. G01F 1/78
[52] U.S. Cl. ................. 73/861.35; 73/861.83
[58] Field of Search .......... 73/861.35, 861.79, 861.83, 73/861.81, 861.82

[56] References Cited

U.S. PATENT DOCUMENTS

| | | | |
|---|---|---|---|
| 972,156 | 10/1910 | Brown | 73/861.79 |
| 3,308,661 | 3/1967 | Stevenson | 73/861.79 |
| 3,575,052 | 4/1971 | Lenker | 73/861.35 |
| 3,613,451 | 10/1971 | Scott | 73/861.35 |
| 3,815,415 | 6/1974 | Wemyss et al. | 73/861.79 |
| 4,291,584 | 9/1981 | Anderson . | |

OTHER PUBLICATIONS

Sales brochure, BIF Company, a division of General Signal, W. Warwick, R.I., "Series 400 Shuntflo Direct Reading Steam Meter", 5/75.
Sales brochure, Cadillac Meter Company, "Cadillac Split Flow Meter", first published Jun. 1981, Port Townsend, Wash., 98368.
Sales brochure, Cadillac Meter Company, "Model HB Split Flow Meter", Oct. 1982, Port Townsend, Wash., 98368.

Primary Examiner—Tim Miles
Attorney, Agent, or Firm—Harness, Dickey & Pierce

[57] ABSTRACT

A mass flow meter for fluids flowing through a conduit wherein the fluid passes through an axial flow driving impeller. A balancing impeller attached to the driving impeller by a shaft rotates in a damping fluid provides a linear torque versus rotational speed relationship. By providing a resistance torque subject to cause the driving impeller to rotate very slowly, the rate of rotation of the shaft becomes proportional to mass flow rate. According to another aspect of the invention, a float submersed within the damping fluid is attached to the shaft whereby an upward acting weight counterbalancing force is exerted. A second embodiment is disclosed including two driving impellers which provides protection for the meter from transient loads exerted by the measured fluid.

16 Claims, 10 Drawing Figures

FLUID FLOW MEASURING DEVICE

BACKGROUND OF THE INVENTION

The invention relates to an improved device for measuring the rate of flow of fluid through a conduit, and more particularly, to a rotating vane meter which measures mass flow rate directly without requiring density compensating subsystems.

It is frequently necessary in an industrial setting to measure the flow of fluids through pipes. For example, in bulk processing of compounds in chemical plants the amount of various fluids being introduced into a reaction vessel must be determined and controlled. In plant operations requiring pressurized air or steam it is often desirable or necessary to monitor consumption of these fluids. In other instances, the supplier of a working fluid or fuel desires to know the quantity of fluid delivered in order that an appropriate fee may be charged.

A number of fluid flow measuring devices are currently known. The most commonly used fluid flow metering devices can be generally categorized as belonging to one of three groups. Positive displacement meters function by receiving and discharging discrete volumes of fluid through, for example, a reciprocating piston in a cylinder. The number of cycles of such a device occurring in a unit period of time is proportional to the flow rate of fluid passing through the meter. Although accurate, positive displacement meters are mechanically complex and are highly sensitive to foreign matter contamination. Obstruction type meters employ an orifice or other restriction in the fluid path and the flow rate is calculated from the measured pressure drop across the restriction. Those meters generally have limited measurement ranges and are highly sensitive to the flow patterns of the fluid passing therethrough. Moreover, obstruction meters provide instantaneous flow measurement which result must be integrated to evaluate total flow. Rotating vane type meters are frequently used in measuring fluid flow. These meters function by causing the flowing fluid to impart a tangential force on an impeller causing rotation thereof. The rotational velocity of the impeller is related to volumetric flow rate. A rapidly spinning impeller, however, produces inaccuracies since it cannot react rapidly to flow rate changes due to rotational inertial effects.

The major disadvantage inherent in each of the types of fluid flow meters described above is the fact that they measure volumetric flow rate rather than mass flow rate. The mass of fluid flowing rather than the volumetric flow rate is often a more significant measurement. Meters which measure volumetric flow rate can frequently be compensated through incorporation of a fluid density sensing mechanism in order that the device measure mass flow rate. This is possible since mass flow rate is the product of volumetric flow rate and fluid density. Fluid density is determined by sensing fluid temperature and pressure. The provision of additional subsystems to correct the meter for mass flow rate requires the incorporation of a number of elements to the meter and thereby tends to increase cost, complexity and negatively affects reliability. More typically, however, currently available flow meters simply ignore density variations in instances where extreme variations in density are not anticipated and relate volumetric flow rate to mass flow rate directly by assuming a certain density. This approach, however, produces errors even when minor density variations are encountered.

Rotating vane type meters such as described above are very widely used since they are relatively inexpensive, reliable and provide total flow measurement. An effort to reduce the impeller inertial effects of rotating vane type meters, reduce bearing wear, simplify impeller balancing and reduce complexity of and wear on the readout device led designers of meters according to the prior art to slow down the rotational speed of the impeller by providing a resistive torque. This feature further was believed to produce a meter which would relate mass flow rate directly with impeller rotational speed. It has been found, however, that meters designed according to these principles do not accurately reflect fluid density variations and hence were not true mass flow meter. The present invention describes an improved rotating vane type meter which overcomes the above-described shortcomings in that accurate mass flow readings are provided.

The meter according to this invention employs a driving axial flow multi-bladed impeller to which a torque is imparted due to fluid reaction against the impeller blades. Resisting rotation of the driving impeller is a balancing impeller which rotates in a fluid such that a linear torque versus rotational speed relationship results. Unlike rotating vane meters according to the prior art, this improved meter measures mass flow rate directly. This result occurs primarily by drastically slowing down the rotational speed of the driving impeller such that a maximum speed at rated capacity is approximately 40 rpm. This compares to the impeller rotational speed of 500 to 1,000 rpm for meters designed according to the prior art. In the development of the present invention, it was found that the effect of the impeller blades moving away from the fluid flowing through the blades was a primary cause of the inaccuracies of previous rotating vane meters in measuring mass flow rate. By drastically slowing the impeller blades, it was discovered that performance approximating that of a completely stalled impeller can be achieved. Meters employing completely stalled vanes are known, but have disadvantages which are avoided by my invention, particularly with respect to the accuracy and complexity of the vane force measuring and readout system.

A second embodiment of a mass flow meter is disclosed herein in which two driving impellers are employed in such manner that the axial loads imposed on each are opposing and ingestion of liquids into the meter will not result in high structural loads on the meter components.

DETAILED DESCRIPTION OF THE INVENTION

A mass flow meter constructed in accordance with this invention provides highly accurate direct measurement of mass flow as opposed to measurement of volumetric flow rate provided by prior art rotating vane meters. This result is achieved by braking the driving turbine impeller in a highly accurate and uniform manner such that it rotates very slowly and thereby approaches the characteristics of a fully stalled impeller which provides a torque directly proportional to mass flow rate. These characteristics are shown by the following mathematical descriptions of first a stalled impeller and second a freely rotating impeller.

Figure 9:
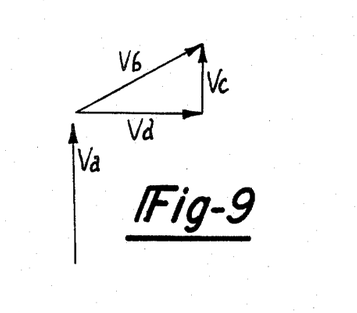
FIG. 9 is a vector diagram showing the magnitude and direction of fluid flow as it passes across a stalled impeller blade.

With reference to FIG. 9, vectors are shown which indicate the magnitude and direction of fluid as it fows across a stalled driving turbine impeller where:

$V_a$ = Velocity of fluid entering impeller.
$V_b$ = Velocity of fluid leaving impeller.
$V_d$ = The component of $V_b$ acting tangent to the direction of rotation of the impeller.
$V_c$ = The axial component of $V_b$ relative to the direction of rotation of the impeller.
$\alpha$ = Angle of total fluid change of direction.

(1)   $V_a = V_b$ Since momentum is conserved and,
(2)   $V_d = V_b \cos \alpha = V_a \cos \alpha$ Rotational forces on the impeller are related as follows, (3)   $F = ma$ where
   F = tangential force on turbine.
   m = mass of fluid acting on impeller.
   a = acceleration.
(4)   $m = (Ad1)(\rho/g)$
   A = area of the impeller blades exposed to fluid flow.
   dl = film thickness of fluid contacting turbine blades.
   $\rho$ = density of fluid being measured.
   g = gravitational acceleration.

Acceleration (a) of the fluid flowing through the impeller is expressed as the product of a proportionality constant ($K_1$) and the velocity vector ($V_d$) magnitude acting tangential to rotation of the turbine or;

(5)   $a = K_1 V_d$ and substituting terms according to equation (2)
(6)   $a = K_1 V_a \cos \alpha$
(7)   $F = [(Ad1)(\rho/g)] K_1 V_a \cos \alpha$ according to equation (3)

Force (F) is related to Torque (T) on the impeller by (8)   $T = Fr$ where r = the distance of the center of the force on the impeller to the center of rotation of the impeller, therefore,
(9)   $T = r[(Ad1)(\rho/g)] K_1 V_a \cos \alpha$ Equation (9) applies where there is no rotation of the impeller. Note that all of the variables remain constant except $\rho$ and $V_a$, therefore, (10)   $T = K_2 \rho V_a$ where $K_2$ = Proportionality constant $$\frac{T}{K_2} = V_a \rho \quad (11)$$

Mass flow rate is defined by:

$$Q = \frac{\rho A V_a}{g} \text{ Where } Q = \text{mass flow rate and since } A \text{ and } g \text{ constant then} \quad (12)$$

(13)   $Q = K_3 V_a \rho$ Where $K_3$ = proportionality constant, rearranging terms
(14)   $(Q/K_3) = V_a \rho$ Combining equations (11) and (14)

$$\frac{Q}{K_3} = \frac{T}{K_2} \text{ or } Q = \frac{K_3}{K_2} T \quad (15)$$

substituting new porportionality constant $K_4$ defined as equal to $K_3/K_2$ then (16)   $Q = K_4 T$ Thus, mass flow rate is directly proportional to torque (T).

Figure 10:
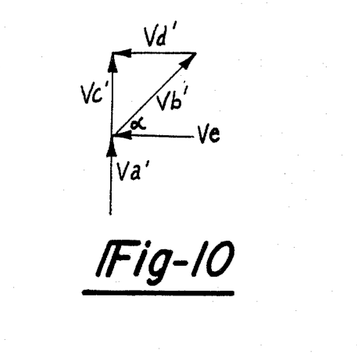
FIG. 10 is a vector diagram showing the magnitude and direction of fluid flow as it passes across a rotating impeller blade.

For instances where the impeller rotates, the vector diagram of FIG. 10 is applicable wherein the vectors with prime subscripts are used to indicate the magnitude and direction of fluid velocity with respect to the impeller as previously described using non-primed subscripts. However, in this illustration:

(17)   $V_{b'} \neq V_{a'}$ since
   $V_{d'} = V_{d'} - V_e$ where $V_e$ = tangential velocity vector of impeller blade due to blade rotation.

Without resisting torque, the value of $V_e$ approaches $V_{d'}$ such that rotation of the turbine is sensitive to fluid velocity only. Since for this example no resistance torque is applied to the impeller, the relationship expressed by equations 1 through 16 become irrelevant and the device is insensitive to the density of fluid flowing therethrough.

It has been found in the development of this invention that if the value of $V_{e'}$ is kept below the product of $V_{a'}$ and 0.007 in steady state conditions the characteristics of the machine are sufficiently close to a stalled turbine thereby providing direct mass flow measurement. This ratio may vary when very rapid fluid velocity and/or density changes occur since the impellers inertia resists instantaneous changes in rotational speed, this effect, however, does not specifically adversely affect meter accuracy when a slowly rotating impeller is used. This ratio generally corresponds to a maximum rotational speed of 401 rpm.

Figure 1:
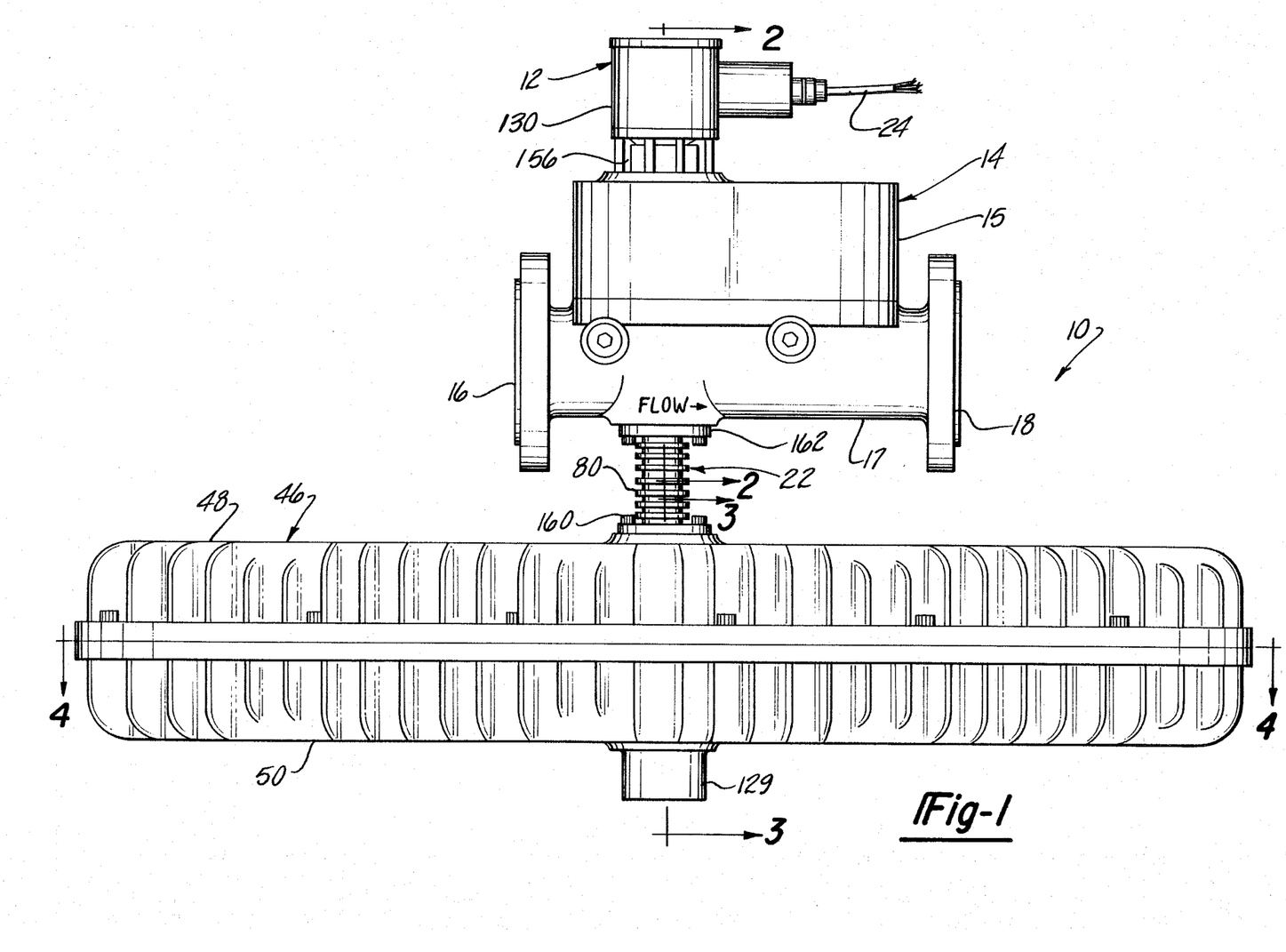
FIG. 1 is a side elevational view of a first embodiment of a mass flow meter constructed in accordance with teachings of the subject invention.

A mass flow meter according to this invention is illustrated in FIG. 1 and is generally designated by reference character 10. Pickup head 12 is mounted to upper housing 14 which is suitably formed of upper and lower sections 15 and 17 respectively bolted together to define inlet and outlet portions 16 and 18. The fluid flow to be measured is conducted through a driving turbine generally designated by reference character 26 shown in FIG. 2. Balancing impeller housing 46 is suspended by a heat dissipating rigid connection tube 22 from turbine housing 14. A readout device in the form of a simple pulse counter (not shown) is connected to pickup head 12 by wires 24. The specific readout device is, of course, subject to variation and does not per se form a part of the invention.

The flow meter mechanism can be divided for the sake of explanation into four subsystems; the driving turbine, balancing system, bearing supports and readout.

Figure 2:
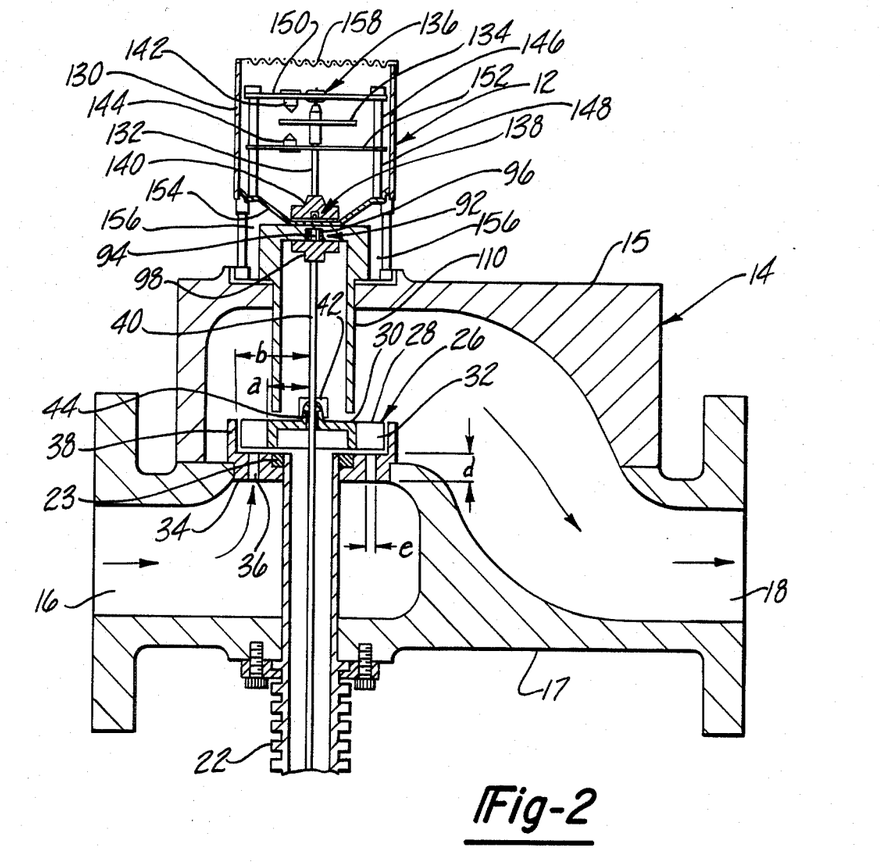
FIG. 2 is a partial sectional view of the mass flow meter shown in FIG. 1 taken along line 2—2 of that Figure showing the major details of the operating mechanisms within the driving turbine housing.
Figures 5, 7, 8:
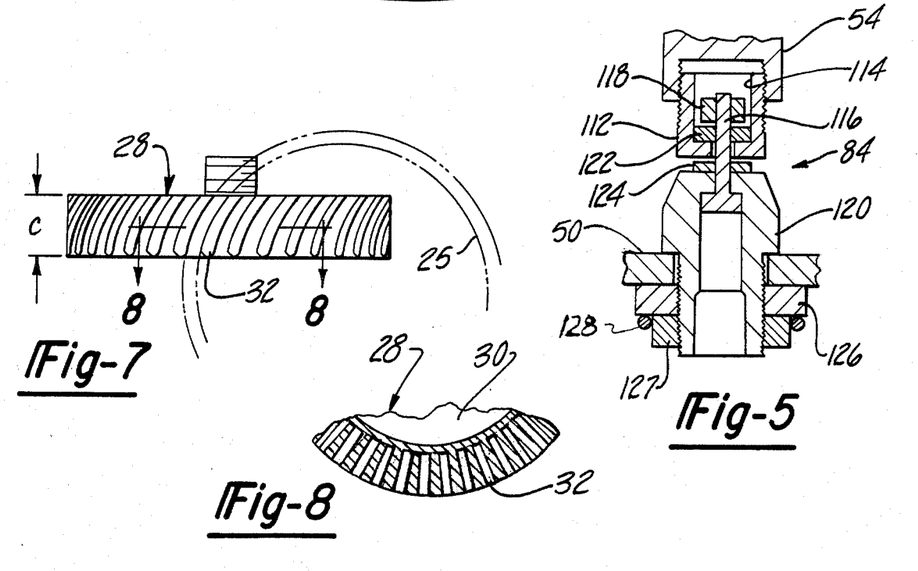
FIG. 5 is a side sectional view of the lower bearing assembly of the mass flow meter shown in detail.
FIG. 7 is a side elevational view of a driving impeller according to this invention.
FIG. 8 is a partial sectional view of the driving impeller shown by FIG. 7 taken along line 8—8 of that Figure.

With reference to FIG. 2, driving turbine 26 includes driving impeller 28 comprising central hub 30 having a plurality of uniformly spaced peripheral blades 32 extending radially therefrom. The profile of blades 32 is shown most clearly in FIGS. 7 and 8 and is characterized as having a low friction airfoil profile. The blades of driving impeller 28 may be fabricated by plunge cutting into a disc shaped blank with a hole saw as shown by FIG. 7 wherein the cutting swath 25 of a hole saw is shown in phantom lines. The leading edges of blades 32 are rounded in order to provide efficient flow. The fluid passage between each pair of adjacent blades will thus have a virtually constant cross sectional area as the fluid passes through the passage. This keeps the pressure nearly constant so that the velocity change is only that due to the small velocity loss resulting from rotation of the impeller. Nozzle plate 34 contains a plurality of radially spaced cylindrical nozzles 36 which produce a uniform flow condition of fluid impacting blades 32 throughout a wide range of flow rates. Furthermore, nozzles 36 straighten the flow so that any rotational swirling induced by upstream irregularities or inlet 16 conditions does not impart torque to driving impeller 28. In developing the invention it was found that a cylindrical nozzle wherein the ratio of the square of the nozzle diameter to the nozzle length is less than 0.085 provides acceptable performance.

A shroud portion 38 integral with nozzle plate 34 closely surrounds driving impeller 28 and acts to prevent fluid flow through nozzle 36 from bypassing driving impeller blades 32 and further prevents fluid flow swirling in fluid outlet 18 from imparting torque to the impeller. Driving impeller 28 is fastened to impeller shaft 40 by nut 42 threadingly engaging impeller hub 30 and a compression fitting 44 frictionally engaging the shaft. Nozzle plate 34 is secured to connection tube 22 and to housing portion 17 by threaded nut 23.

Figure 3:
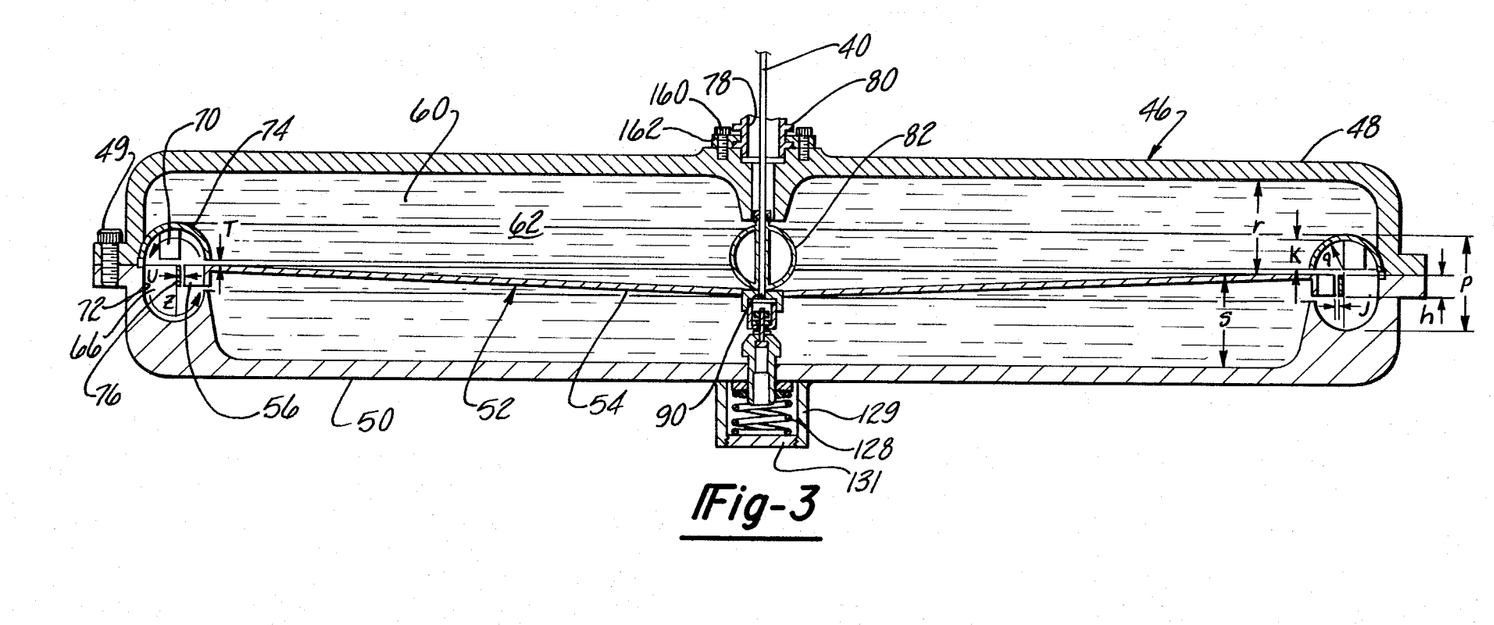
FIG. 3 is a partial sectional view of the mass flow meter shown in FIG. 1 taken along line 3—3 of that Figure showing the major details of the operating mechanisms within the balancing impeller housing.
Figure 4:
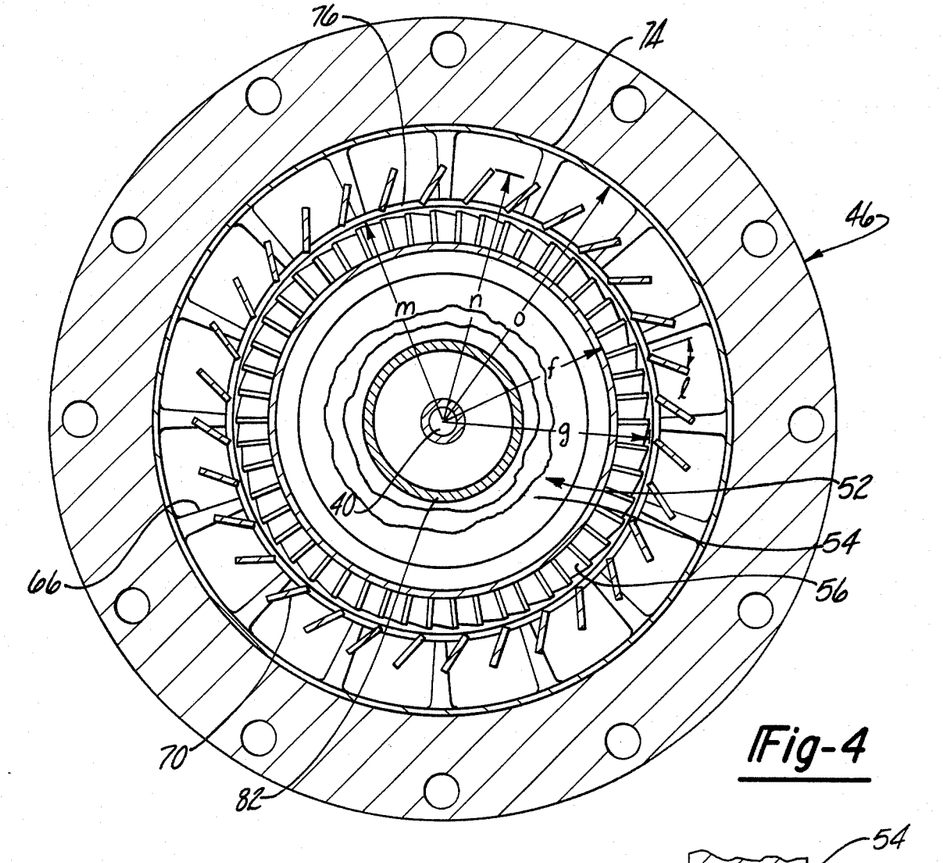
FIG. 4 is a top sectional view of the balancing impeller housing taken along line 4—4 of FIG. 1, with a radial mid-section broken away in order to more clearly illustrate the component parts in the balancing impeller housing.

Referring to FIGS. 3 and 4, balancing housing 46 is constructed from housing portions 48 and 50 fastened together by bolts 49 and forms an internal cavity 60. Balancing impeller 52 is comprised of hub portion 54 and blades 56, and is fastened to shaft 40 to turn as a unit with driving impeller 28. Rotation of balancing impeller 52 results from torque transmitted to shaft 40 by driving impeller 26. Balancing impeller cavity 60 is filled with a damping fluid 62 such as water or a high density fluid such as mercury or another high density liquid in order to provide a desired relationship between revolutions per minute and torque in accordance with the invention. In conjunction with the properties of the selected damping fluid, the ratio of diameters between driving impeller 28 and balancing impeller 52 is chosen to provide the desired resisting torque characteristics. The flow of dampening fluid 62 through balancing impeller 52 and the rate of rotation of the impeller are controlled by balancing impeller blades 56, straightening vanes 66, shroud 76, fins 70 and the boundaries established by redirecting groove 72 and redirecting shell 74. The damping fluid 62 is caused to circulate as indicated by arrow Z in FIG. 3 within the generally toroidal boundaries established by redirecting groove 72 and redirecting shell 74 within which impeller blades 56 rotate. Straightening vanes 66 and fins 70 act upon fluid 62 to remove a portion of the rotational circulation put into the fluid by balancing impeller blades 56. Without removing such rotation once the damping fluid is accelerated the resisting torque would decrease. By removing a fixed proportion of damping fluid rotation thereby requiring damping fluid acceleration, a resisting torque proportional to speed results. A shroud 76 in the form of an annular collar surrounding blades 56 and supported by straightening vanes 66 prevents fluid 62 which is being pumped through impeller blades 56 from flowing radially therefrom. Permitting radial flow in this area has been found to produce nonlinearities in performance. The provision of fluid flow paths as shown and described, results in a linear torque versus rotational speed relationship.

As previously described, the mass flow rate of fluid flowing through driving impeller 28 is proportional to the torque applied to the impeller. Balancing impeller 52 is so designed that the relationship between torque and angular speed is linear. Therefore, a given speed of impeller shaft 40 in revolutions per minute is related to a specific torque and a specific instantaneous mass flow rate. Further, if the number of revolutions over a time interval is measured, the total flow during that time is measured. The counting of revolutions of driving impeller 28 is therefore a mechanical means of integrating the mass flow rate over time to measure flow during a time interval. Expressed in another way, an instantaneous mass flow rate of a certain value exerts a particular level of power upon shaft 40, and by measuring total revolutions, a measure of total energy is provided which is directly related to total mass flow.

Connection tube 22 defines an internal bore 78 and is provided with heat dissipating ribs 80 so that when temperature fluids are being metered the balancing housing 46 is effectively protected from overheating by conduction from upper housing 14. Connection tube 22 extends into inlet cavity 16 and mates with nozzle plate 34 thereby protecting shaft 40 from contamination and direct loading due to contact with moving fluids. Connection tube 22 is fastened to the lower section 17 of turbine housing 14 and to the upper portions 48 of balancing housing 46 by bolts 160 which cooperate with split locking plates 162.

The weight of the assembly supported by shaft 40 is counter balanced by float 82 attached to shaft 40 within chamber 60. Float 82 weighs less than the volume of fluid 62 which it displaces providing an upwardly acing buoyant force which reduces the thrust loading on lower bearing assembly 84. Float 82 is fixed to shaft 40 by compression fitting 86 and compression nut 88. Float 82 further coacts with impeller shaft head 90 to position balancing impeller 52 on the shaft 40. In order to at least partially offset the axial load exerted on shaft 40 by driving impeller 28, balancing impeller 52 is designed to pump the dampening fluid upwardly so that its reaction force generates a downward axial load on shaft 40. Upper bearing assembly 92 comprises a pin 94 and a ring 96 and functions only to confine shaft 40 radially. Pin 94 projects from magnetic coupling driver 98 which will be described below in connection with the pickup assembly. Standpipe 110 which threadingly engages upper section 15 of turbine housing 14 supports ring 96. Standpipe 110 further extends downwardly into outlet 18 to protect shaft 40 from becoming contaminated and further shields the shaft from direct dynamic fluid loading.

Lower bearing assembly 84 is shown in detail in FIG. 5. A cupped externally threaded nut 112 threadingly engages balancing impeller hub 54 and includes end bore 114. Pin 116 projects into nut 112 where it carries a fixed head 118. The lower end of pin 116 is fast in a hollow bearing adjusting nut or bushing 120. First bearing 122 centers pin 116 and acts as an upward thrust bearing through contact with head 118. Second bearing 124 acts as a downward thrust bearing through contact with nut 112. Adjusting nut 120 is threaded into bearing ring 126 and lock nut 127, permiting adjustment of the vertical position of shaft 40 and therefore the clearance between the driving impeller 28 and nozzle plate 34, and between magnetic coupling driver 98 and the top of standpipe 110. Adjustment is achieved by loosening lock nut 127 and rotating bearing ring 126 with respect to adjusting nut 120. Lower bearing assembly 84 is held in position by the force exerted by spring 128 retained within nipple 129 formed by housing portion 50. Spring 128 is trapped within nipple 129 by threaded pipe plug 131.

The pickup head subsystem best shown by FIG. 2 is generally designated by reference character 12 and permits measurement of the rotation of shaft 40. Pickup shaft 132 within head 12 carries a slotted disc 134 fast thereon. Shaft 132 is mounted in low friction jewel bearing assemblies 136 and 138. Rotation of magnetic coupling driver 98 causes rotation of magnetic coupling driven member 140 through the interaction of permanent magnets according to well-known principles. Rotation of slotted disc 134 acts to interrupt light from photo emitter 142 as received by phototransistor 144 also according to well-known principles. Since upper housing 14 may be elevated in temperature and since the performance of elements 142 and 144 may be adversely affected if exposed to such temperature, heat insulating means are employed. Post members 146 and 148 are composed of materials of low heat conductivity such as stainless steel. Plates 150 and 152 are made from plastic materials. Heat deflector 154 has a reflective bottom surface to reflect radiant heat away from pickup head 12. Pickup head housing 130 is also provided with an open air space 156 and air convection is provided by openings below head housing 130 and by screen 158 at the top of pickup head 12. By employing the appropriate electronical signal processing device, the output of pickup head 12 may be used to indicate instantaneous flow rate or be used as a totalizing meter over time.

As an alternative to or in addition to an electronic pickup head as described above, a mechanically driven low friction readout system well-known in the art can be employed.

By way of illustration, dimensions and construction details for a meter embodying the techniques of this invention are set forth below. A mass flow meter constructed according to the following specifications is suitable for the measurement of steam up to 100 psi gage pressure and 425 degrees Farenheit and has a maximum flow capacity of 540 pounds per hour. This example is provided for illustrative purposes only. The configuration described is only one of any number of devices which could be constructed in view of this disclosure. The dimensions to which the following alphabetical reference characters relate are found with reference to FIGS. 2, 4 and 7. All linear dimensions are expressed in inches unless otherwise stated.

Driving impeller 28 includes thirty-six uniformly spaced blades each having the contour shown by FIGS. 7 and 8. The dimensions for driving impeller 28 follow:
  a—inner radius of blades 32—0.84 inches.
  B—outer radius of blades 32—1.16
  c—blade height—0.5
Nozzle plate 34 includes eight uniform diameter jets uniformly circumferentially and radially spaced such that their longitudinal axes intersect the center of blades 32. Other dimensions are as follows:
  d—thickness—0.875 (Same as thickness of nozzle plate 34)
  e—jet throat diameter—0.25
Balancing impeller 52 has fifty flat thin blades 56 uniformly radially spaced, each blade at a forty-five degree angle with respect to the balancing impeller 52 axis of rotation. Other balancing impeller parameters are:
  f—inner radius of balancing impeller blade 56—8.5
  g—outer radius of balancing impeller blade 56—10.0
Balancing impeller cavity 60 includes shroud 76, and thirty-two fins 70 spaced uniformly circumferentially. Sixteen straightening vanes 66 are also provided and are uniformly circumferentially spaced. The damping fluid used for this example is plain water. Additional dimensional details of the balancing impeller cavity are specified below.
  h—thickness of shroud 76—1.5
  j—separation gap between balancing impeller blades 56 and shroud 76—0.19
  k—height of fins 70—2.25
  l—angle of fins 70—60°
  m—inner radius of fins 70—10.19
  n—outer radius of fins 70—12.0
  o—outer radius of balancing impeller cavity 60—13.75
  p—height of toroidal impeller cavity—6.375
  q—sectional radius of balancing impeller cavity 60—2.25
  r—height of impeller cavity 60 from balancing impeller 52 top surface—4.5
  s—depth of impeller cavity 60 from balancing impeller 52 top surface—4.5
  t—gap between balancing impeller 52 and shell 74—0.19
  u—thickness of shroud 76—0.375
In view of this specification, the remainder of construction details will be apparent to persons having ordinary skill in the art to which this invention relates.

Figure 6:
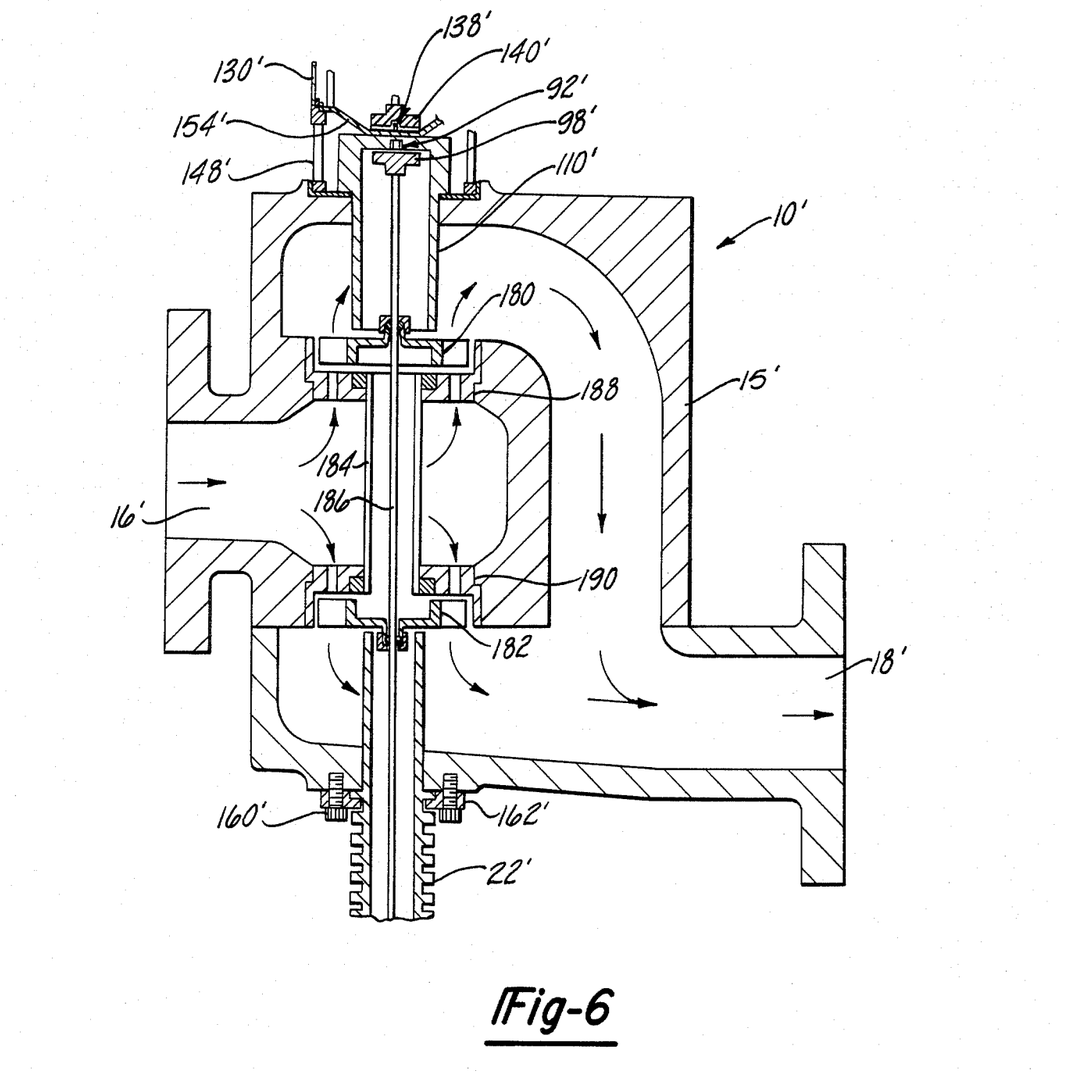
FIG. 6 is a partial side sectional view of a second embodiment of a mass flow meter according to this invention, wherein two driving impellers are employed.

A second embodiment of a mass flow meter according to this invention is shown in FIG. 6. Reference characters which refer to analogous elements as described in connection with the first embodiment are designated by like reference characters primed. The meter 10' illustrated employs elements identical to those described with reference to the first embodiment except as otherwise noted. Mass flow meter 10' employs two driving impellers 180 and 182 wherein a portion of the measured fluid passes upwardly through first impeller 180 while the balance flows downwardly through second impeller 182. Tube member 184 protects shaft 186 between nozzle plates 188 and 190 associated with impellers 180 and 182 respectively. The result of employing two impellers is that the axial shaft loads exerted by each are offset. Although generally the shaft supporting features described with regard to the first embodiment will provide acceptable performance, in applications where fluids of two phases pass through the meter undesirable potentially damaging transient shaft loads may result. By providing two impellers as described, these loads ae imparted to each in opposing directions and are thereby offsetting.

While preferred embodiments of the invention have been described herein, it will be appreciated that various modifications and changes may be made without departing from the spirit and scope of the appended claims.

I claim:

1. A meter for providing to a readout device a signal proportional to the mass flow of a fluid passing therethrough comprising:
    a turbine housing having a fluid inlet and a fluid outlet,
    a turbine in said turbine housing including a driving impeller interposed between said fluid inlet and said fluid outlet whereby fluid passing through said turbine imparts a driving torque to said driving impeller,
    a balancing housing forming an internal cavity containing a damping fluid,
    an impeller shaft fastened to said driving impeller and rotatable therewith, said shaft extending into said balancing housing cavity,
    a balancing impeller rotatably mounted within said damping fluid in said cavity and fastened to said impeller shaft such that said driving impeller and said balancing impeller rotate simultaneously, said balancing impeller causing pumping of said damping fluid resulting in a resisting torque which is proportional to the speed of rotation of said driving impeller, and
    pickup means for sensing said rotation and for providing a signal to said readout device, characterized in that the size and configurations of said turbine and said balancing impeller and the characteristics of said damping fluid are so proportioned and related to each other that the tangential speed of the outermost radial portion of said driving impeller does not exceed 0.007 times the velocity of fluid passing through said driving turbine, whereby the rate of rotation of said impellers and said impeller shaft and said signal to said readout device are closely proportional to said mass flow rate of said fluid.

2. The meter according to claim 1 wherein said balancing housing cavity includes a generally toroidal-shaped damping fluid conduction path and said damping impeller includes a plurality of vanes within said conduction path.

3. The meter according to claim 1 including upper and lower bearing assemblies rotatably supporting said shaft, said upper bearing assembly including an upper bearing support having a pin and bushing and said lower bearing assembly including a lower bearing support having two bearings, and a bearing adjusting nut which adjusts clearances of said upper and lower bearing assemblies.

4. The meter according to claim 1 wherein said pickup means comprises, a pickup shaft suspended by bearings, magnetic coupling means for transmitting rotation of said impeller shaft to said pickup shaft, a light source, a photosensitive cell, and a light interrupter affixed to rotate on said pickup shaft and interposed between said light source and said photosensitive cell.

5. The meter according to claim 4 wherein said pickup means further comprises a radiant heat reflector positional to oppose heat radiation from said turbine housing to said pickup means.

6. A meter for providing to a readout device a signal proportional to the mass flow of a fluid passing therethrough comprising:
    a turbine housing having a fluid inlet and a fluid outlet,
    a turbine in said turbine housing including a driving impeller interposed between said fluid inlet and said fluid outlet whereby fluid passing through said turbine imparts a driving torque to said driving impeller,
    a balancing housing forming an internal cavity containing a damping fluid,
    an impeller shaft fastened to said driving impeller and rotatable therewith, said shaft extending into the said balancing housing cavity,
    a balancing impeller rotatably mounted within said damping fluid in said cavity and fastened to said impeller shaft such that said driving impeller and said balancing impeller rotate simultaneously, said balancing impeller causing pumping of said damping fluid resulting in a resisting torque which is proportional to the speed of rotation of said driving impeller, and
    pickup means for sensing said rotation and for providing a signal to said readout device, characterized in that the diameter of said balancing impeller is at least one and one half times that of said driving impeller.

7. A meter for providing to a readout device a signal proportional to the mass flow of a fluid passing therethrough comprising:
    a turbine housing having a fluid inlet and a fluid outlet,
    a turbine in said turbine housing including a driving impeller interposed between said fluid inlet and said fluid outlet whereby fluid passing through said turbine imparts a driving torque to said driving impeller,
    a balancing housing forming an internal cavity containing a damping fluid,
    an impeller shaft fastened to said driving impeller and rotatable therewith, said shaft extending into the said balancing housing cavity,
    a balancing impeller rotatably mounted within said damping fluid in said cavity and fastened to said impeller shaft such that said driving impeller and said balancing impeller rotate simultaneously, said balancing impeller causing pumping of said damping fluid resulting in a resisting torque which is proportional to the speed of rotation of said driving impeller, and
    pickup means for sensing said rotation and for providing a signal to said readout device, characterized in that the diameter of said balancing impeller is approximately ten times that of said driving impeller.

8. A meter for providing to a readout device a signal proportional to the mass flow of a fluid passing therethrough comprising:
    a turbine housing having a fluid inlet and a fluid outlet,
    a turbine in said turbine housing including a driving impeller interposed between said fluid inlet and said fluid outlet whereby fluid passing though said turbine imparts a driving torque to said driving impeller, a balancing housing forming an internal cavity containing a damping fluid, an impeller shaft fastened to said driving impeller and rotatable therewith, said shaft extending into the said balancing housing cavity, a balancing impeller rotatably mounted within said damping fluid in said cavity and fastened to said impeller shaft such that said driving impeller and said balancing impeller rotate simultaneously, said balancing impeller causing pumping of said damping fluid resulting in a resisting torque which is proportional to the speed of rotation of said driving impeller, pickup means for sensing said rotation and for providing a signal to said readout device, and a float attached to said shaft in said fluid in said cavity, said float providing an upward buoyant force at least partially offsetting the weight of components attached to said impeller shaft.

9. The meter according to claim 8 wherein said damping fluid comprises a low melting point metal.

10. A meter for providing to a readout device a signal proportional to the mass flow of a fluid passing therethrough comprising:

a turbine housing having a fluid inlet and a fluid outlet, a turbine in said turbine housing including a driving impeller interposed between said fluid inlet and said fluid outlet whereby fluid passing through said turbine imparts a driving torque to said driving impeller, a balancing housing forming an internal cavity containing a damping fluid, an impeller shaft fastened to said driving impeller and rotatable therewith, said shaft extending into said balancing housing cavity, a balancing impeller rotatably mounted within said damping fluid in said cavity and fastened to said impeller shaft such that said driving impeller and said balancing impeller rotate simultaneously, said balancing impeller causing pumping of said damping fluid resulting in a resisting torque which is proportional to speed of rotation of said driving impeller, and pickup means for sensing said rotation and for providing a signal to said readout device, characterized in that said damping fluid comprises a liquid having a density greater than water.

11. The meter according to claim 10 wherein said metal is mercury.

12. In a fluid flow meter of the type including a driving impeller caused to rotate by the flow of fluid therethrough, a balancing impeller which rotates in a damping fluid which provides a resisting torque proportional to the speed of rotation of said balancing impeller, a shaft connecting said impellers, pickup means for sensing rotation of said shaft to provide a signal to a readout, and bearing means for rotatably supporting said shaft, the improvement comprising:

resistance means including a fluid imposing on said balancing impeller a resisting torque opposing the torque of the driving impeller with a force such that the tangential speed of the outermost radial segment of said driving impeller does not exceed 0.007 times the fluid velocity through said driving impeller whereby said rotation of said shaft is proportional to the mass flow of said fluid through said turbine.

13. A meter for providing to a readout device a signal proportional to the mass flow of a fluid passing therethrough comprising:

a turbine housing having a fluid inlet and a fluid outlet, a turbine in said turbine housing including a driving impeller interposed between said fluid inlet and said fluid outlet whereby fluid passing through said turbine imparts a driving torque to said driving impeller, a balancing housing forming an internal cavity containing a damping fluid, a shaft fastened to said driving impeller and rotatable therewith, said shaft extending into said balancing housing cavity, a balancing impeller rotatably mounted within said damping fluid in said cavity and fastened to said shaft such that said driving impeller and said balancing impeller rotate simultaneously, said balancing impeller causing pumping of said damping fluid resulting in a resisting torque which is proportional to the speed of rotation of said driving impeller, pickup means for sensing the rate of said rotation and for providing a signal to said readout device, an orifice plate located within said turbine housing between said driving impeller and said fluid inlet, a plurality of cylindrical nozzles carried by said orifice plate, the ratio between the square of the diameter of each of said nozzles to the length of said nozzle is less than 0.085, whereby said nozzles provide a nearly uniform flow condition of said fluid.

14. A meter for providing to a readout device a signal proportional to the mass flow of a fluid passing therethrough comprising:

a turbine housing having a fluid inlet and a first and second fluid outlet, a first driving turbine in said housing including a first driving impeller interposed between said inlet cavity and said first outlet whereby said fluid passing across said first impeller imparts a driving torque thereto proportional to said mass flow, a second driving turbine in said housing including a second driving impeller interposed between said inlet cavity and said second outlet whereby fluid passing across said second turbine imparts a driving torque thereto proportional to said fluid mass flow, said torques on said first and said second driving impellers acting in the same rotational directions, a balancing housing forming an internal cavity containing a damping fluid, a shaft fastened to said first and second driving impellers for rotation therewith, said shaft extending into the said balancing housing cavity, a balancing impeller rotatably mounted within said damping fluid in said cavity and fastened to said shaft such that said driving impellers and said balancing impeller rotate simultaneously, said balancing impeller causing pumping of said damping fluid resulting in resisting torque which is proportional to the speed of rotation of said driving impellers, and pickup means for sensing said rotation and for providing a signal to said readout device.

15. A meter for providing to a readout device a signal proportional to the mass flow of a fluid passing therethrough comprising:
- a turbine housing having a fluid inlet and a fluid outlet,
- a turbine in said turbine housing including a driving impeller interposed between said fluid inlet and said fluid outlet whereby fluid passing through said turbine imparts a driving torque to said driving impeller,
- a balancing housing forming an internal cavity containing a damping fluid and a toroidal balancing cavity,
- an impeller shaft fastened to said driving impeller and rotatable therewith, said shaft extending into said balancing housing cavity,
- a balancing impeller rotatably mounted within said damping fluid in said balancing cavity and fastened to said impeller shaft such that said driving impeller and said balancing impeller rotate simultaneously, said balancing impeller causing pumping of said damping fluid from a discharge to a suctions side of said impeller thereby causing rotational circulation of said damping fluid,
- a plurality of damping fluid redirecting surfaces which remove a fixed proportion of said damping fluid rotational circulation whereby a resisting torque proportional to the speed of rotation of the driving impeller results, and
- pickup means for sensing said rotation and for providing a signal to said readout device.

16. A meter for providing to a readout device a signal proportional to the mass flow of a fluid passing therethrough comprising:
- a turbine housing having a fluid inlet and a fluid outlet,
- a turbine in said turbine housing including a driving impeller interposed between said fluid inlet and said fluid outlet whereby fluid passing through said turbine imparts a driving torque and an upward acting thrust to said driving impeller,
- a balancing housing forming an internal cavity containing a damping fluid and a torodidal balancing cavity,
- an impeller shaft fastened to said driving impeller and rotatable therewith, said shaft extending into said balancing housing cavity,
- a balancing impeller rotatably mounted within said damping fluid in said balancing cavity and fastened to said impeller shaft such that said driving impeller and said balancing impeller rotate simultaneously, said balancing impeller causing pumping of said damping fluid from a discharge to a suction side of said impeller thereby causing rotational circulation of said damping fluid,
- a plurality of damping fluid redirecting surfaces which remove a portion of said damping fluid rotational circulation such that said balancing impeller exerts a downward acting thrust offsetting said upward acting thrust exerted by said driving impeller, and
- pickup means for sensing said rotation and for providing a signal to said readout device.

* * * * *